United States Patent [19]

Mori et al.

[11] Patent Number: 5,394,102
[45] Date of Patent: Feb. 28, 1995

[54] NON-REPEATABLE RUN-OUT MEASURING INSTRUMENT USING ENCODER SIGNALS BASED UPON THE BACK EMF OF A MOTOR AS TRIGGER SIGNALS

[75] Inventors: Shigeyoshi Mori; Ryuji Mizuguchi, both of Fujieda, Japan

[73] Assignee: Victor Company of Japan, Ltd., Yokohama, Japan

[21] Appl. No.: 44,398

[22] Filed: Apr. 8, 1993

[30] Foreign Application Priority Data

Apr. 10, 1992 [JP] Japan ................... 4-118231

[51] Int. Cl.$^6$ ............................................. G01R 1/04
[52] U.S. Cl. ..................................... 324/772; 324/177
[58] Field of Search ................................. 324/772, 177

[56] References Cited

U.S. PATENT DOCUMENTS

| | | | |
|---|---|---|---|
| 4,784,497 | 2/1987 | Katsumura | 324/177 |
| 5,200,675 | 4/1993 | Woo | 318/254 |
| 5,231,338 | 1/1993 | Bulgarelli et al. | 318/254 |

FOREIGN PATENT DOCUMENTS 3-63095  6/1991  Japan.

*Primary Examiner*—Kenneth A. Wieder
*Assistant Examiner*—Barry C. Bowser
*Attorney, Agent, or Firm*—Michael N. Meller

[57] ABSTRACT

The specification discloses an NRR (Non-Repeatable Run-out) measuring instrument for measuring the NRR of the rotating object motor to be measured without installation of a special attachment such as an encoder. In the NRR measuring instrument of the invention, encoder signals are obtained from back-electromotive forces developed at driving coils of the rotating object motor by removing spike noise thereof by LPF 30U, 30V, 30W and reformed by a wave shaping circuits 32U, 32V, 32W. The encoder signals together with digitized displacement signals generated by noncontact displacement measuring instrument 14 through A/D 28 are inputted to a CPU 34. In the CPU 34, sampled data are acquired from the digitized displacement signals being triggered by the encoder signals and the NRR is calculated based on the sampling data.

7 Claims, 4 Drawing Sheets

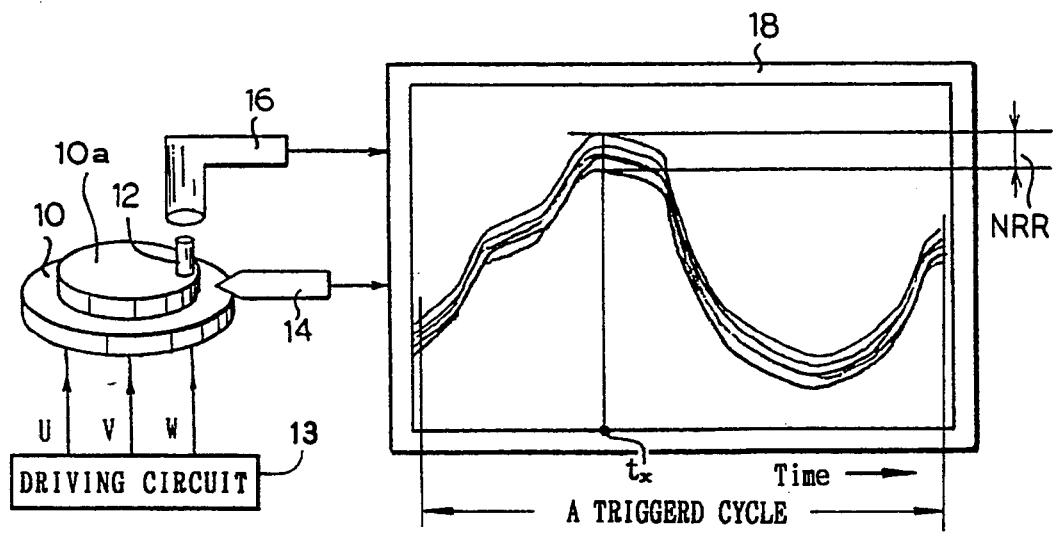
*Fig.1 (A) PRIOR ART*
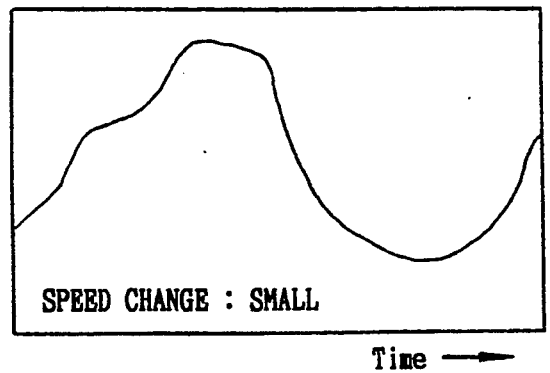
*Fig.1 (B) PRIOR ART*
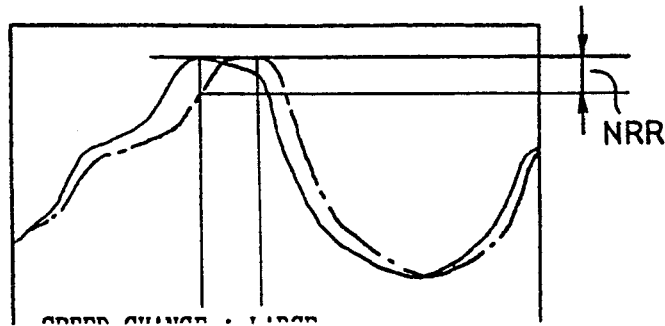
*Fig.1 (C) PRIOR ART*

NON-REPEATABLE RUN-OUT MEASURING INSTRUMENT USING ENCODER SIGNALS BASED UPON THE BACK EMF OF A MOTOR AS TRIGGER SIGNALS

BACKGROUND OF THE INVENTION

1. Field of the Invention

The present invention relates to a Non-Repeatable Run-Out (referred to as NRR hereafter) measuring instrument for a motor and it particularly relates to an NRR measuring instrument suitable for a thin-type HDD (Hard Disc Drive) employing a sensorless motor as a spindle motor.

2. Description of the Related Art

Presently, a thin-type HDD having a spindle motor is widely used for driving or rotating a disc on which information data are recorded and/or reproduced by using a magnetic head.

An NRR (Non-Repeatable Run-Out) is a significant criterion of a motor, particularly of a spindle motor of the HDD, to know how irregularly the motor rotates the disc of which a locus of its run-out is different at every turn i.e. non-cyclic, or how regularly the motor rotates the disc with a repeatable run-out locus.

As well known, in the HDD, information signals are recorded along a predetermined track on the disc by using the magnetic head, and the information signals recorded on the track are reproduced with the same magnetic head along the predetermined track. At that time, if a run-out locus of the disc at the reproduction is greatly different from that of the disc at the recording, i,e., the NRR of the motor is large, it is impossible for the magnetic head to follow the run-out locus and to reproduce the information signal from the recorded track correctly.

Thus, as a recent trend, the NRR for the spindle motor employed in the HDD is required to be below 0.3 μm.

FIGS. 1 (A) through (C) are explanatory figures showing NRR measuring method of a prior art.

Referring to FIG. 1(A), a numeral 10 designates a 3-phase brushless motor (electrically commutated motor) having a rotor 10a exposed to an ambient outside, which motor 10 is an object of the NRR measuring, 12 an index mounted on a peripheral portion of the rotor 10a, 13 a driving circuit for driving the 3-phase brushless motor 10, 14 a noncontact displacement measuring instrument for measuring displacement or run-out of the rotor 10a without contacting the rotor 10a, 16 an index-sensor for sensing the index 12 and generating an index signal, and 18 an oscilloscope for displaying a displacement signal thereon generated from the noncontact displacement measuring instrument 14.

In this prior art, the displacement signal from the noncontact displacement measuring instrument 14 is observed on the oscilloscope 18 which is triggered by the index signal from the index-sensor 16, so that the displacement signal is repeatedly displayed on the oscilloscope 18 for every trigger cycle determined by the index signal, and the largest amplitude difference in displayed waveforms of the displacement signal caused at a time tx is defined as the NRR of the motor 10 as illustrated in FIG. 1 (A).

However, in the above mentioned method, if there is a large speed variation among respective revolutions of the motor 10, it is impossible to obtain the correct NRR of the motor 10.

For instance, if both the rotational speed variation and the NRR of the motor 10 is very small, then a simple wave form as shown in FIG. 1 (B) will be observed, however, if the rotational speed variation of the motor 10 (jitter) is very large, even if the NRR is actually very small, a complex waveform will be observed as shown in FIG. 1 (C) since a peak position of the waveform shifts between a time $t_1$ and a time $t_2$ due to the variation of the rotational speed. Accordingly, a large amount of the NRR will be seemingly observed on the oscilloscope 18 even when the actual NRR of the motor 10 is actually very small.

As an improvement of this NRR measuring method, there is another NRR measuring method of the prior art.

FIG. 2 is a schematic diagram showing the other NRR measuring method of the prior art.

Referring to FIG. 2, the object motor 10 to be measured is provided with an encoder disc 20 mounted on a spindle. In measuring the NRR, the revolution of the encoder 20 is detected by an encoder head 22, and encoder pulses from the encoder head 22 are inputted to a CPU (Central Processing port) 24 through an I/O (Input/Output Unit) 26.

On the other hand, displacement signal from the noncontact displacement measuring instrument 14 is converted into a digital signal by an A/D converter 28, and the digitized signal is inputted to the CPU 24 through the I/O 26. As a result, triggered by the encoder signal, sampled data are obtained from the digitized displacement signal.

TABLE 1

| rev. (m) ↓ | trigger (n) → | | | | |
|---|---|---|---|---|---|
| | 1 | 2 | 3 | ... | 8 |
| 1 | d(1,1) | d(1,2) | d(1,3) | | d(1,8) |
| 2 | d(2,1) | d(2,2) | d(2,3) | | d(2,8) |
| 3 | d(3,1) | d(3,2) | d(3,3) | | d(3,8) |
| 4 | d(4,1) | d(4,2) | d(4,3) | | d(4,8) |
| . | | | | d(m,n) | |
| 64 | d(64,1) | d(64,2) | d(64,3) | | d(64,8) |

In this prior art, since eight encoder pulses are obtained per revolution of the motor 10, data sampling is performed eight times per revolution of the motor 10. Further, data sampling is conducted performed for 64 revolutions of the motor, as a result, displacement data d(m,n) (wherein m=1~64, n=1~8) are obtained as shown in TABLE 1.

In the CPU 24, a calculation is carried out to obtain the NRR of the motor 10 on the displacement data d(m,n) according to an expression (1) below.

$$NRR = MAX\{n=1\sim 8\}[MAX\{m=1\sim 64\}d(m,n) - MIN\{m=1\sim 64\}d(m,n)] \quad (1)$$

In the expression (1), MAX{m=1~64}d(m,n) signifies the maximum value of the data d(m,n) among m=1~64 in the same column n, on the other hand MIN{m=1~64}d(m,n) signifies the minimum value of the data d(m,n) among m=1~64 in the same column n. In other words, the former and the latter expression respectively signify the maximum and the minimum data in every column containing 64 data in TABLE 1. Then, 8 remainders are obtained by subtracting the minimum values of data from the maximum values of data taken from respective columns. Thus, the NRR of the motor 10 is obtained as the maximum remainder among the 8 remainders.

However, this NRR measuring method requires installation of the encoder 20 every object motor 10 to be measured, which is disadvantageous in mass-production. Further, the installation of the encoder to a motor, particularly a thin motor, poses a problem that it is difficult to detect the displacement of peripheral portion of the rotor 10a because an installation of the noncontact displacement measuring instrument 14 is limited by the encoder 20.

SUMMARY OF THE INVENTION

Accordingly, a general object of the present invention is to provide an NRR measuring instrument in which the above disadvantages have been eliminated.

More specific object of the present invention is to provide an NRR measuring instrument for measuring the NRR of the rotating object motor to be measured without installation of a special attachment such as an encoder on the rotor of the motor.

Another and more specific object of the present invention is to provide an NRR measuring instrument for measuring an NRR of a motor having driving coils and a rotor by using displacement data obtained by measuring displacement of the rotor of the motor comprising, displacement detecting means for detecting displacement of the rotor of the motor and generating displacement data, encoder signal generating means for generating encoder signals based on back-electromotive forces developed at terminals of the driving coils of the motor, sampling means for acquiring sampled data from the displacement data being triggered by the encoder signals, data storage means for storing the sampling data therein, and arithmetic means for calculating the NRR by using the sampled data stored in the data storage means.

Other objects and further features of the present invention will be apparent from the following detailed description.

BRIEF DESCRIPTION OF THE DRAWINGS

FIGS. 1 (A) through (C) are explanatory figures showing an NRR measuring method of a prior art.

DETAILED DESCRIPTION OF THE PREFERRED EMBODIMENT

An embodiment of NRR measuring instrument of a motor according to the present invention will be described with reference to the drawings, in which identical components to those of the described conventional examples are depicted by identical characters without detailed explanation thereof.

Figure 2:
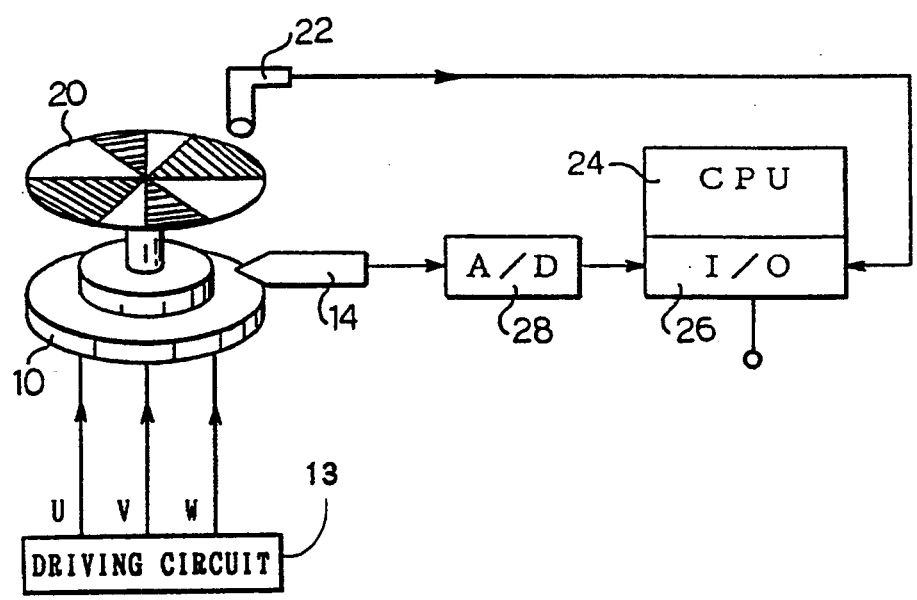
FIG. 2 is a schematic diagram showing another NRR measuring method of the prior art.
Figure 3:
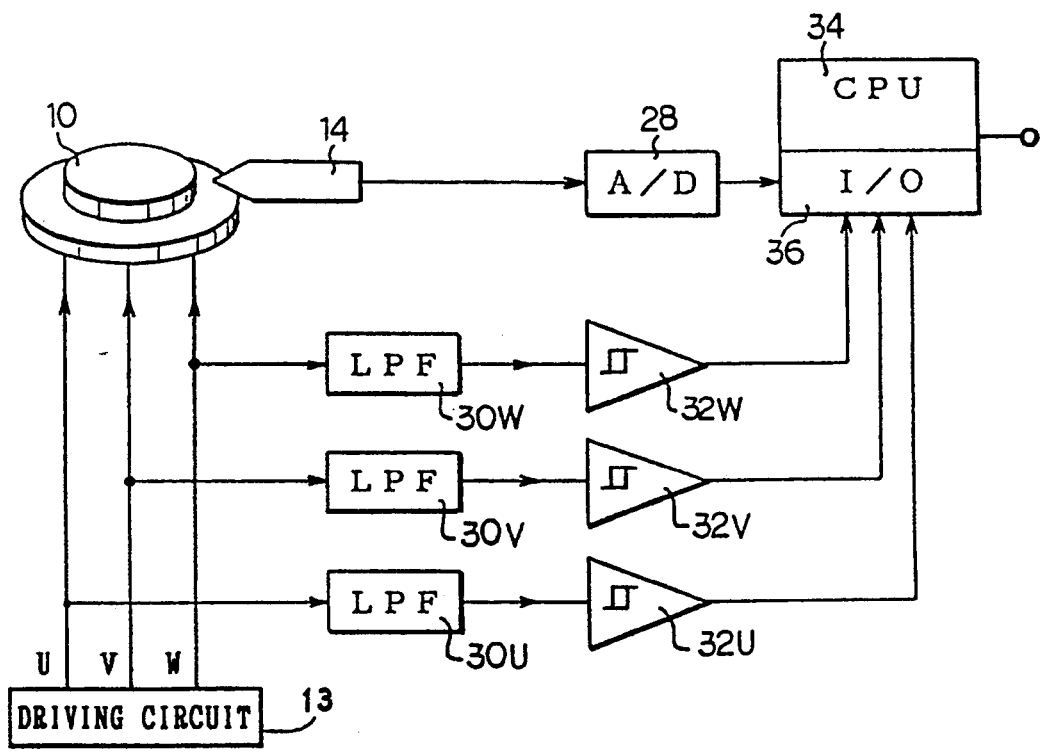
FIG. 3 is a construction diagram of an embodiment of the NRR measuring instrument according to the present invention.

FIG. 3 is a construction diagram of an embodiment of the NRR measuring instrument according to the present invention.

Figure 4:
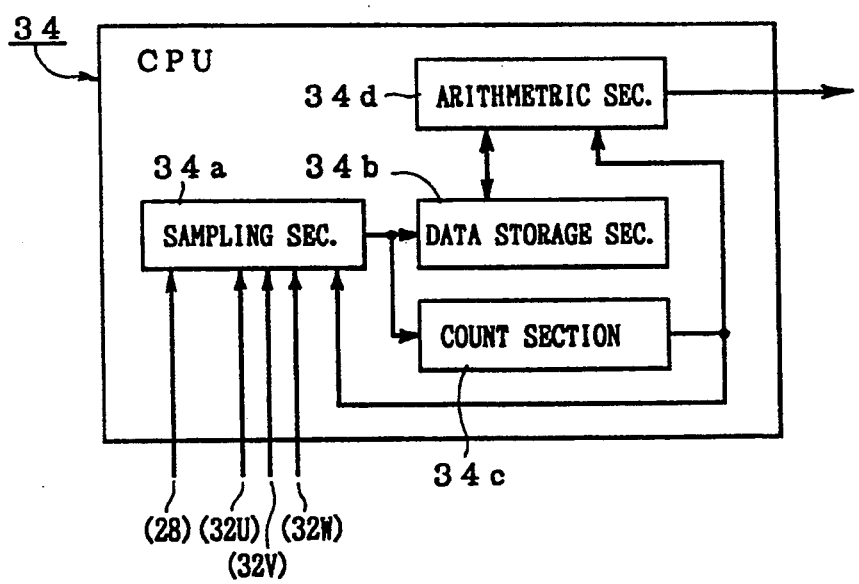
FIG. 4 is a functional block diagram of CPU shown in FIG. 3.

FIG. 4 is a functional block diagram of a CPU shown in FIG. 3.

Figure 5:
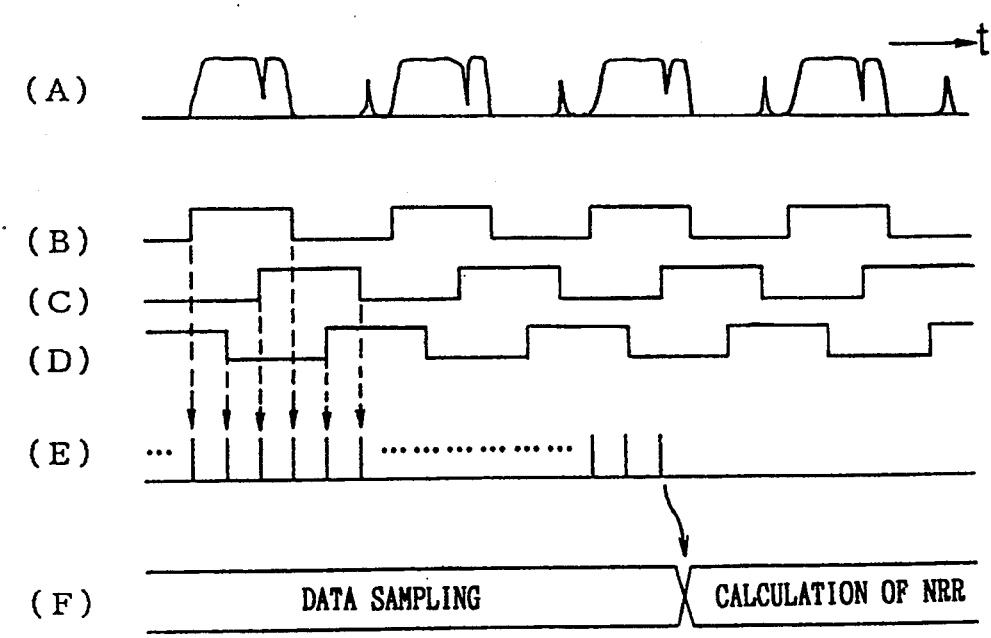
FIGS. 5 (A) through (F) are timing charts of the embodiment shown in FIG. 3 of the present invention.

FIGS. 5 (A) through (F) are timing charts of the embodiment shown in FIG. 3 of the present invention.

Referring to FIG. 3, low-pass filters (referred to as LPF hereafter) 30U, 30V, 30W are respectively connected to 3-phase (U, V, W) driving coils (not shown) of the object motor 10 to be measured. Outputs of the LPF 30U, 30V, 30W are respectively connected to wave-shaping circuits 32U, 32V, 32W and outputs of the wave shaping circuits 32U, 32V, 32W are connected to an I/O 36 of a CPU 34, to which an output of the A/D converter 28 is also connected.

Next, the description is given to the CPU 34 referring to FIG. 4, wherein respective outputs of the A/D converter 28 and the wave-shaping circuits 32U, 32V, 32W are connected to a sampling section 34a, and an output of the sampling section 34a is connected to both a data storage section 34b and a count section 34c. The data storage section 34b is accessible by an arithmetic section 34d, and the result counted by the count section 34c is supplied to both the sampling section 34a and the arithmetic section 34d. The NRR obtained by the arithmetic section 34d is outputted to an outside display through the I/O 6.

In the above components of the NRR measuring instrument of the embodiment, the LPF 30U, 30V, 30W are provided for obtaining back-electromotive forces developed at junctions between the driving circuit 13 and the driving coils of the motor 10 and for removing spike noises thereof. The wave-shaping circuits 32U, 32V, 32W are provided for obtaining encoder signals by shaping waveforms of input signals.

Further, the sampling section 34a of the CPU 34 is for acquiring sampled data from the digitized displacement signal obtained by the noncontact displacement measuring instrument 14 through A/D 28, triggered by the encoder signal derived from the back-electromotive forces of the driving coils of the motor 10. The data storage section 34b is for storing the sampled data of the displacement signals therein. The counter section 34c is for counting a number of the sampled data, and the arithmetic section 34d is for calculating the NRR on the basis of the sampled data stored in the data storage section 34b.

Next, the description is given to an operation of the above embodiment referring to FIG. 5.

FIGS. 5 (A) through (F) are timing charts of the embodiment of the present invention.

When the motor 10 is driven or rotated by applying the 3-phase electric power thereto from the driving circuit 13, the back-electromotive forces are generated in the driving coils (not shown) of the motor 10. For instance, there shown a wave shape of a back-electromotive force of U-phase in FIG. 5 (A). Respective waveforms of back-electromotive forces of V-phase and W-phase are the same as that of the U-phase except for phases. After spike noises are removed from the waveforms of these back-electromotive forces by the LPF 30U, 30V, 30W, they are reformed by the wave-shaping circuit 32U, 32V, 32W to obtain encoder signals as shown in FIGS. 5 (B) through 5 (D), which are inputted to the sampling section 34a through the I/O 36.

On the other hand, displacement of the peripheral portion of the motor 10 caused by rotation of the motor 10 is detected by the noncontact displacement measuring instrument 14. After the displacement signal is converted to digital signal by the A/D converter 28, the digitized signal is inputted to the sampling section 34a. In the sampling section 34a, sampled data are acquired from the digitized signal, triggered by every edge of digital waveforms of the encoder signals as shown in FIGS. 5 (E) and 5 (F). Thus, if the motor 10 has 12 poles driven by 3-phase electric power, for instance, data sampling is conducted 32 times per revolution of the motor 10, since sampled data are acquired by a trigger timing of every zero-cross of the back-electromotive force.

The sampled data signals of the displacement signal are stored in the data storage section 34b. Upon being stored, the number of the sampled data is counted at the count section 34c. When the counted number reaches 2304 (=36×64), i.e., 64 revolutions, a signal from the counter section 34c is inputted to the sampling section 34a and the arithmetic section 34d to stop the data sampling and to start the calculation of the NRR.

TABLE 2 shows sampling data of the displacement signal stored in the data storage section 34b, wherein the sampling data is shown as displacement data $d(i,j)$ ($i=1\sim64$, $j=1\sim36$).

TABLE 2

| rev. (i) ↓ | trigger (j) → | | | | |
|---|---|---|---|---|---|
| | 1 | 2 | 3 | ... | 36 |
| 1 | d(1,1) | d(1,2) | d(1,3) | | d(1,36) |
| 2 | d(2,1) | d(2,2) | d(2,3) | | d(2,36) |
| 3 | d(3,1) | d(3,2) | d(3,3) | | d(3,36) |
| 4 | d(4,1) | d(4,2) | d(4,3) | | d(4,36) |
| . | . | . | . | d(m,n) | . |
| . | . | . | . | | . |
| 64 | d(64,1) | d(64,2) | d(64,3) | | d(64,36) |

Next, the description is given to the calculation of the NRR.

In the arithmetic section 34d, the NRR is calculated on the basis of expression (2) on the displacement data $d(i,j)$.

$$NRR = MAX\{j=1\sim36\}[MAX\{i=1\sim64\}d(i,j) - MIN\{i=1\sim64\}d(i,j)] \quad (2)$$

In expression (2), $MAX\{i=1\sim64\}d(i,j)$ signifies the maximum value of data $d(i,j)$ among $i=1\sim64$ in the same column j, on the other hand $MIN\{j=1\sim64\}d(i,j)$ signifies the minimum value of data $d(i,j)$ among $i=1\sim64$ in the same column j. In other words, the former and the latter expressions respectively signify the maximum and the minimum value of data $d(i,j)$ in every column ($j-1\sim36$) containing 64 data (when j=1, d(1,1), d(2,1), d(3,1), d(4,1), ..., d(63,1)) as shown in TABLE 2. Then, 36 remainders are obtained by subtracting the minimum values of data(i,j) from the maximum values of data(i,j) taken from respective columns ($j=1\sim36$). Thus, the NRR of the motor 10 is obtained as the maximum remainder among the 36 remainders on the basis of $MAX\{j=1\sim36\}$ of the expression (2). The NRR obtained is outputted to a known display means through the I/O 36.

As mentioned in the foregoing, according to the present invention, sampled data are acquired from the digitized displacement signal triggered by edge of digital waveforms of back-electromotive forces generated in the driving coils of the motor to be measured. Therefore, if a rotational speed variation of the motor occurs in the measurement, the NRR measuring instrument of the present invention prevents noises due to jitters from occurring in the NRR. Further, it does not require any attachment such as the encoder disc, which is advantageous in the measuring work and in the mass-production.

Next, the description is given to other embodiments of the present invention.

(1) In the foregoing embodiment, the present invention is applied to a brushless motor, however, it is applicable to a motor regardless of having a sensor for detecting a rotational position (for instance hole elements) or not. Further more, it should be noted that the phase number of driving power is not limited to the 3-phase electric power.

(2) In the foregoing embodiment, sampled data are acquired as triggered by both edges of the waveform of back-electromotive forces, however, it is able to be triggered by either a rise or a fall edge of the digital waveform. Further, in the embodiment, sampled data are acquired for 64 revolutions of the motor, however, it is optionally changeable also.

What is claimed is:

1. An NRR (Non-Repeatable Run-out) measuring instrument for measuring an NRR of a motor having driving coils and a rotor by using displacement data obtained by measuring displacement values produced due to run-out of the rotor of the motor, comprising:

displacement value detecting means for detecting the displacement values due to the run-out of the rotor of the motor and generating displacement data due to the run-out of the rotor;

encoder signal generating means for generating encoder signals based on the back-electromagnetic forces developed across the driving coils of the motor; with said encoder signals having edges of digital waveforms of the back-electromotive forces;

sampling means responsive to the edges of said digital waveforms for generating sampling data signals in timed correspondence with said edges;

data storage means for storing said sampling data signals; and arithmetic means for calculating a value of the NRR from said displacement data in proportion to the number of sampled data signals stored in the data storage means.

2. An NRR measuring instrument as claimed in claimed 1, further comprises a driving circuit for driving the driving coils of the motor.

3. An NRR measuring instrument as claimed in claim 2, wherein the driving circuit outputs a 3-phase electric power to the driving coils of the motor to be measured.

4. An NRR measuring instrument as claimed in claim 1, wherein the displacement value detecting means is a noncontact displacement measuring instrument.

5. An NRR measuring instrument as claimed in claimed 1, wherein the encoder signal generating means comprises a low-pass filter for removing spike noises from the output of the back-electromotive force and a wave-shaping circuit for shaping a waveform of the back-electromotive force to obtain the encoder signals.

6. An NRR measuring instrument as claim in claim 3, wherein the motor to be measured is a brushless motor.

7. An NRR measuring instrument as defined in claim 1 further comprising counting means for counting the number of sampled data signals in said data storage means and means for stopping the sampling means from generating further sampling data signals when the counted number of sampled data signals corresponds to a predetermined number of motor revolutions.

* * * * *